Aug. 29, 1939. H. WOCHNER 2,171,282
COUPLING PLATE FOR WHEEL PRESSES
Filed Jan. 9, 1936 2 Sheets-Sheet 1

INVENTOR.
Henry Wochner,
BY Walter N. Haskell
his ATTORNEY.

Aug. 29, 1939.                    H. WOCHNER                    2,171,282
                        COUPLING PLATE FOR WHEEL PRESSES
                            Filed Jan. 9, 1936          2 Sheets-Sheet 2
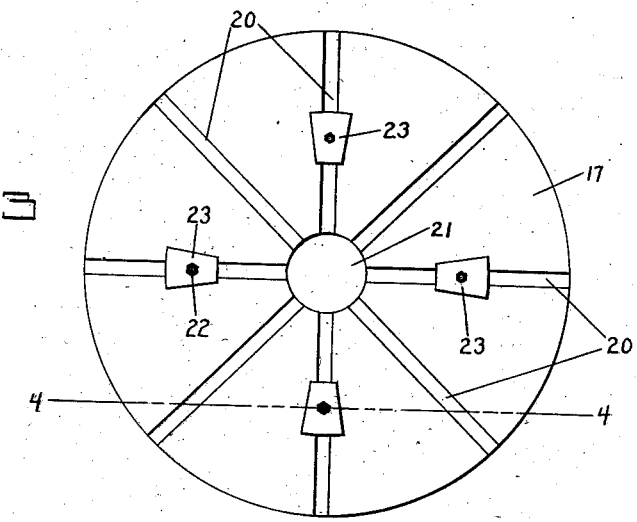
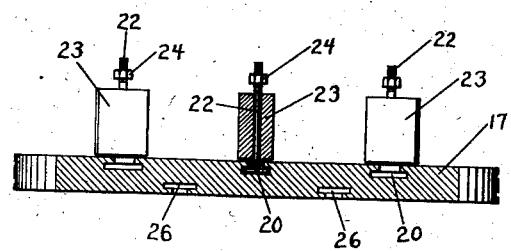
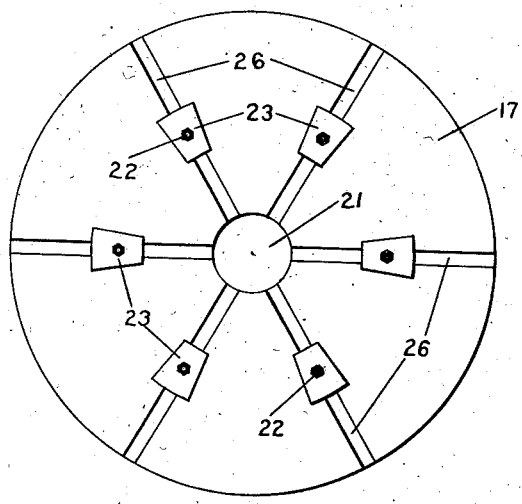
INVENTOR.
Henry Wochner,
BY Walter N. Haskell,
his ATTORNEY.

Patented Aug. 29, 1939

2,171,282

UNITED STATES PATENT OFFICE 2,171,282

COUPLING PLATE FOR WHEEL PRESSES

Henry Wochner, Rock Island, Ill.

Application January 9, 1936, Serial No. 58,306

1 Claim. (Cl. 144—288)

My invention has reference to a coupling plate for wheel presses, and is designed for use with a heavy type of bending machines, the purpose of which is to detect and assist in the correction of deformities in the rims and other parts of automobile wheels. The invention is of the type shown in Letters Patent of the United States No. 1,971,821, issued to Johnston August 28, 1934. Such machines, or wheel presses, include a circular bed or table upon which the wheel is supported, and a central post or plunger to which the wheel is connected while it is being operated on. For the effective carrying out of the operation the wheel is rigidly connected with the central support. This is accomplished by bolting the hub of the wheel to a plate or disk which is clamped or otherwise secured to the central support. The flanges of the wheel hubs are provided with openings which are utilized in attaching such hub to the supporting member. In the present practice it is found necessary to make use of a number of connecting plates or templets, each of which is provided with a plurality of bolt openings variously arranged so that one or other of the plates will conform to the arrangement of openings in the hubs, which are variously positioned in different cars. Even with a variety of such plates and openings provided it frequently happens that the holes in the hubs have a different arrangement, and will not conform thereto. Additional plates must then be provided and holes drilled therein.

The purpose of the present invention is to make use of a single plate or disk, with an arrangement for the support of fastening devices in a universal manner, so that the one plate is suited to all the requirements.

In the accompanying drawings:

Fig. 3 is a plan view of the disk 17.

Fig. 4 is a vertical section on the broken line 4—4 of Fig. 3.

Fig. 5 is a lower face view of the disk 17.

Figure 1:
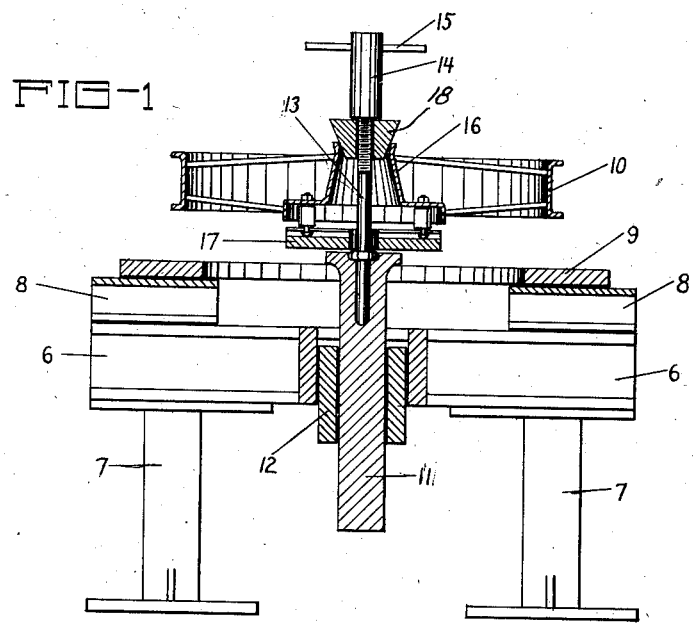
Fig. 1 is a medial vertical section of a machine equipped with the invention.
Figure 2:
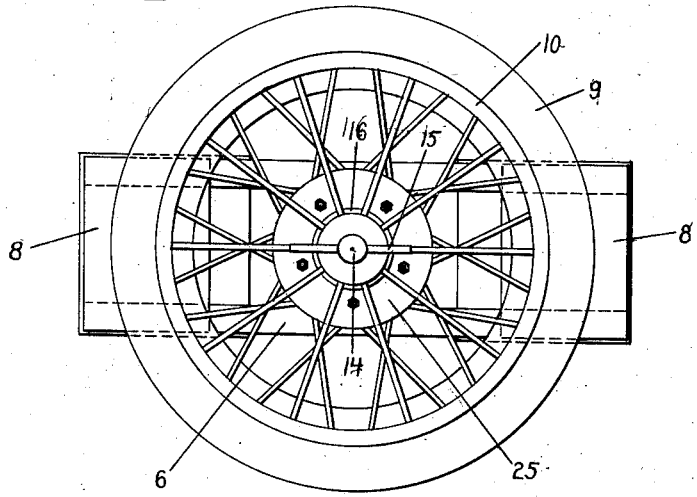
Fig. 2 is a plan view thereof.

The main frame of the wheel press consists of a pair of beams 6, preferably formed of channel-plate, mounted on supports 7. The ends of said beams are united by cross-plates 8, upon which is fixed a circular support 9, in a horizontal plane, and adapted to receive one of the faces of a wheel rim, such as is shown at 10. Centrally of the machine is a plunger 11, in a mounting 12, capable of vertical movement therein, and usually provided with means for actuating the same, not shown in the drawings herein, as it is not involved in the present application.

Fixed in the upper end of the plunger 11 is a shaft 13, threaded at its upper end to receive a nut 14, provided with hand holds 15. The hub 16 of the wheel is secured to a circular plate 17 which bears against the upper end of the plunger 11. In the upper end of the hub is a cone 18 against which the nut 14 bears, and by turning the nut downwardly the hub and coupling plate are clamped tightly against the end of the plunger. By lowering said plunger the rim is moved downwardly into contact with the face of the support 9, and in case of any deformities in the rim the same are readily detected and may be corrected.

The present invention has special reference to the style of coupling plate 17, as shown more particularly in Figs. 3 to 5. As shown therein the upper face of the plate is provided with a series of radial channels 20 of T formation, extending inwardly to a central opening 21 for the passage of the shaft 13. The channels are adapted to receive the head ends of bolts 22, slidable in the channels, and which bolts pass upwardly through blocks 23, and are provided on their upper ends with nuts 24. The flange-plate 25 of the hub 16 is supported on the blocks 23, and is provided with openings for the bolts 22, the positions of which openings vary greatly in different types of cars. By shifting the bolts and blocks inwardly or outwardly along the channels the positions of the bolts can be made to conform to said openings. After the bolts are seated the hub is secured tightly in place by the nuts 24. As shown in the drawings in Fig. 3 the upper face of the disk 17 is provided with eight of the channels, which will provide for a great number of requirements of change in location, but to give still greater range thereto the lower face of the disk is provided with an additional six channels, 26 as shown in Fig. 5. These channels are usable in the same manner with the bolts 22. When the hub plate is secured tightly in place the heads of the bolts are engaged in the channels, and held from movement therein.

What I claim and desire to secure, is:

In a universal coupling plate for wheel presses, a disk provided in each of its faces with a series of radial T-channels, bolts provided with heads for slidable engagement within said channels, spacer blocks mounted on said blocks and having portions also slidable along said channels, adapted to hold an object to a wheel hub with a laterally extending flange and a certain angular spacing of bolt-holes therearound in spaced relation with said disk, and means for connecting said wheel hub on said spacer blocks with said bolts, the channels in one of said faces being radially divergent from those in the other face, and varying in angular position therewith to conform to a different angular spacing of bolt-holes in another type of wheel hub.

HENRY WOCHNER.